Oct. 20, 1925.  
I. A. OLIVER  
1,557,767  
GUIDE BEARING FOR VERTICAL PUMP SHAFTS  
Filed Sept. 20, 1924     2 Sheets-Sheet 1

INVENTOR  
I. A. Oliver  
OWN ATTORNEY

Oct. 20, 1925.
I. A. OLIVER
1,557,767
GUIDE BEARING FOR VERTICAL PUMP SHAFTS
Filed Sept. 20, 1924    2 Sheets-Sheet 2
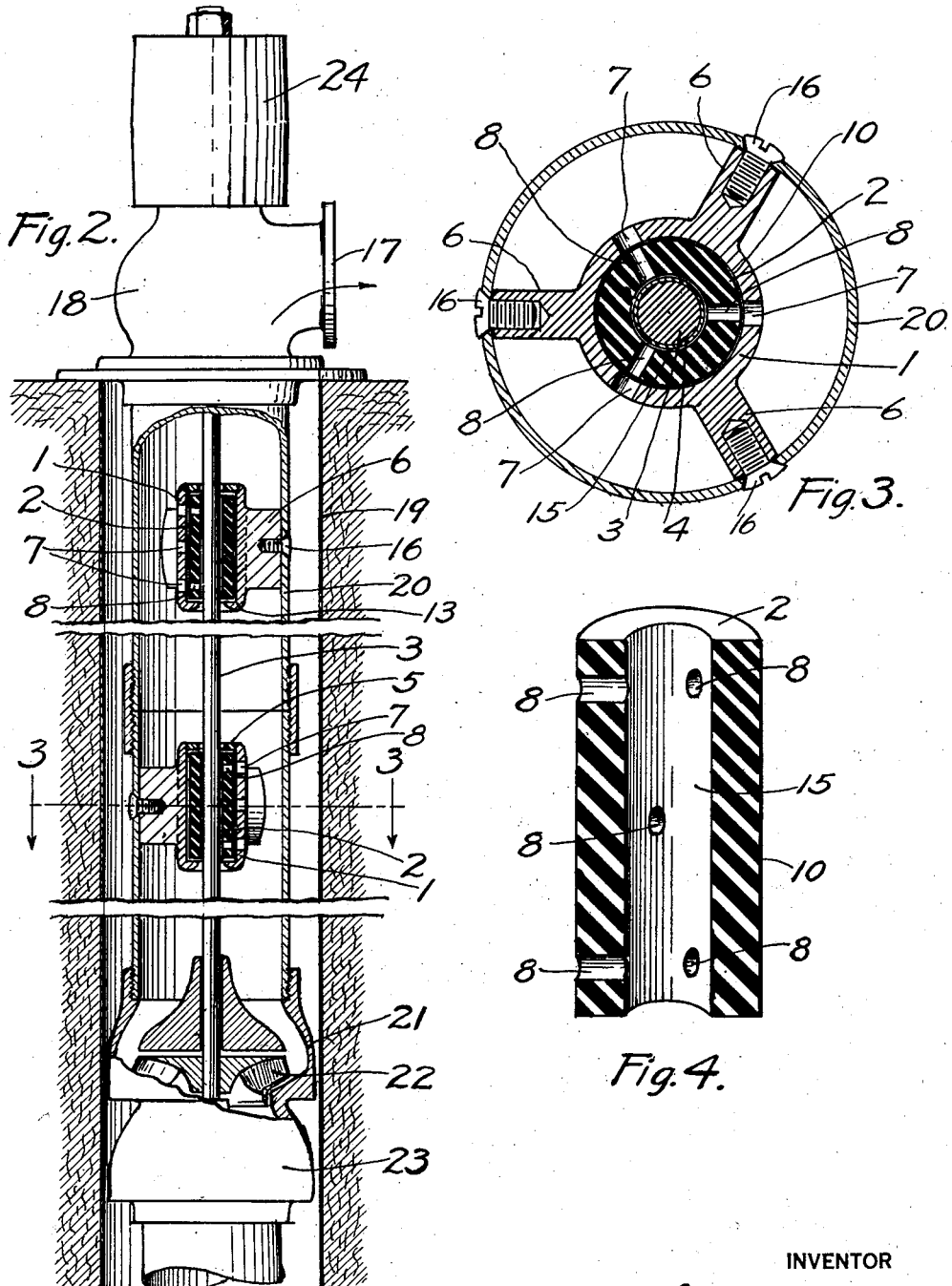
INVENTOR
I.A.Oliver
OWN ATTORNEY Patented Oct. 20, 1925.

1,557,767

UNITED STATES PATENT OFFICE.

IMMANUEL ALVIN OLIVER, OF POMONA, CALIFORNIA.

GUIDE BEARING FOR VERTICAL PUMP SHAFTS.

Application filed September 20, 1924. Serial No. 738,919.

*To all whom it may concern:*

Be it known that I, IMMANUEL ALVIN OLIVER, a citizen of the United States, residing at Pomona, in the county of Los Angeles and State of California, have invented certain new and useful Improvements in Guide Bearings for Vertical Pump Shafts, of which the following is a specification.

My invention relates to new and useful improvements in vertical guide bearings and more particularly to a water lubricated resilient guide bearing for vertical drive shafts of deep well turbine pumps and other similar hydraulic machinery.

It is a well known fact that the drive shafts of deep well pumps and similar hydraulic machinery operate under very severe wearing conditions, due to the corrosion, friction and vibration in the bearings supporting said shafts. Owing to the pressure and action of the water, it is very difficult to effect and maintain the proper oil or grease lubrication on these bearings and, consequently, the destructive action of sandy grit, friction and corrosion quickly destroy the conventional metallic bearing surfaces and the shaft itself.

It has been found that vulcanized rubber and similar resilient materials when submerged in and wetted or lubricated by water or watery liquid form a very durable bearing composition, resisting wear and corrosion, and being especially resistent to scoring or cutting out by sand or grit carried by the water. Furthermore, it provides a resilient bearing element which cushions the shaft against chattering and vibration.

It is an object of this improvement to provide a resilient bearing element for operatively supporting said pump shaft which will be submerged in and automatically lubricated by the water or liquid being delivered by the pump.

It is a further object to provide a cylindrical resilient bearing sleeve, preferably of vulcanized live rubber, revolubly mounted within a recessed annular supporting element and adapted to receive the revoluble pump shaft, said bearing sleeve being free to revolve relative to both the supporting element and the shaft, and suitable means being provided in the supporting element for limiting the endwise movement of the sleeve.

A still further object is to provide a series of holes or perforations in the walls of said rubber bearing sleeve, permitting free circulation of water or liquid between the inner and outer walls or surfaces of said sleeve. The invention further provides radially opening ports or holes in the cylindrical wall of the supporting element surrounding the rubber sleeve, which match or coincide with the openings in the rubber sleeve, thus effecting positive and efficient circulation of water or liquid between and over all the revoluble surfaces of the guide bearing.

It is a still further object to provide against rusting and corrosion by covering the bearing portions of the steel pump shaft with a non-corrosive metal sleeve permanently attached to said shaft. Also every part of the stationary supporting element or bearing chamber which comes in direct contact with the rubber bearing sleeve is preferably constructed of non-corrosive metal.

The accompanying drawings illustrate an embodiment of my invention, and in said drawings:

Fig. 2 is a vertical section of a pump embodying my invention installed in a well, the head portions and a part of the pump bowls thereon being in elevation;

Fig. 3 is a horizontal section on line 3—3 of Fig. 2, showing the clearance between the revoluble members of the bearing, and also showing the perforations in the rubber sleeve in a position opposite the holes in the stationary supporting element;

Fig. 4 is a vertical section of the rubber bearing sleeve, showing the preferred position and form of the perforations.

Figure 1:
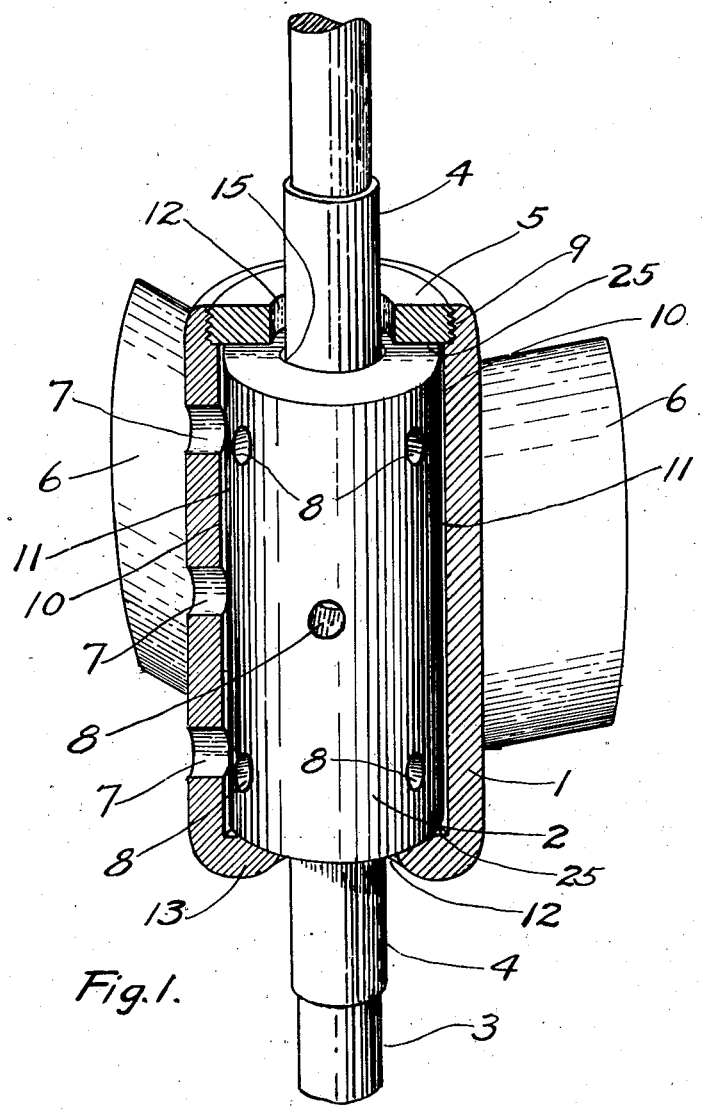
Figure 1 is a vertical section of the guide bearing supporting element, showing the rubber bearing sleeve and a portion of the pump shaft in perspective, also the shaft protective sleeve.

The preferred embodiment of my invention, as illustrated in the drawings and as previously set forth, consists essentially in a stationary supporting element, formed at the center with an annular recessed bearing chamber and having a resilient perforated bearing sleeve revolubly mounted therein and adapted to receive the revoluble pump shaft and form a bearing therefor.

The supporting element 1 consists of a central hub having a cylindrical bore axially disposed and forming the bearing chamber 11, and radially extended supporting arms or spokes 6, 6, which may be attached to the wall of the discharge pipe 20 by the screws 16 or in any other preferred manner. The lower end of bearing chamber 11 is provided with an annular internal flange 13 forming a shoulder for retaining the rubber sleeve 2 and limiting the end play of the same. Also, at the upper end of said bearing chamber 11, a flange, ring or collar 5 is fitted in place by a threaded connection 9 after the bearing sleeve 2 is inserted into the chamber 11. A certain amount of clearance is provided between the pump shaft 3 and the annular flanges 13 and 5 to permit free circulation of water and to prevent the shaft 3 from rubbing thereon.

The bearing sleeve 2 consists of a cylindrical sleeve of resilient material, preferably vulcanized live rubber. It is of uniform section, as shown in Fig. 4, having smooth square ends and smooth inner wall 15 and outer wall 10 and having a series of radial perforations 8, 8, piercing said walls and arranged throughout the surfaces of the sleeve, thus providing additional circulation of water or liquid throughout every portion of the bearing. When in running position within the bearing chamber 11, the bearing sleeve 2 is provided with a side clearance between the walls 10 and 11 and end play at ends 25 permitting same to revolve freely within said enclosure, there being just sufficient clearance to allow a thin film of liquid to form between the opposed revolving surfaces. Proper clearance is also provided between the inner wall 15 and pump shaft protective sleeve 4 allowing said pump shaft to revolve freely within said bearing sleeve 2 and providing free circulation of a thin film of water or liquid between the opposed surfaces.

To further insure a positive uniform circulation of the water or liquid throughout the entire guide bearing, a series of ports or holes 7, 7, are provided in the walls of the bearing chamber 11 of the supporting element 1 and so arranged and proportioned that, as the bearing sleeve 2 revolves within said chamber 11, there is set up a centrifugal action by virtue of the radial perforations 8, 8, in the said sleeve, which induces circulation outwardly, tending to draw the water or liquid inwardly at the center 15 around the pump shaft and discharge it radially through the said perforations 8, 8, which as they pass by, or coincide with, communicating ports 7, 7 in the wall of the bearing chamber 11, form a through passage communicating with the outer body of water of liquid surrounding the guide bearing. In addition to the lubricating feature of this induced circulation, it also tends to dislodge grit and sand from between the respective members. Fig. 3 shows a set of the perforations 8, 8, of the bearing sleeve in line or in communication with ports 7, 7, of the bearing chamber 11.

To obtain the best results with this type of guide bearing, it is preferred that all parts coming in contact with the rubber bearing sleeve 2 be either lined with or constructed of non-rustable non-corrosive materials or metals. Therefore, it is preferred to construct the supporting element having the bearing chamber 11 of some suitable non-ferrous, non-rustable metal, or lining the interior of said chamber with some suitable non-rustable non-corrosive material. Also the pump shaft 3 may be constructed of the same materials but, since it is preferred to use steel on account of the strength required, it becomes necessary to provide against corrosion and rusting by placing upon the pump shaft a non-corrosive, non-rustable sleeve 4 covering that portion of the shaft which operates in the guide bearing, as shown in Fig. 1. This protective sleeve 4 is permanently attached to the shaft 3 so as to practically form a part thereof.

In Fig. 2 is shown an embodiment of my resilient guide bearing as applied to a deep well pump. The discharge pipe 20 which is usually made up of a plurality of sections connected together by couplings and installed in a well casing 19 carries the pump bowls 21 and 23 at its lower end and the entire pump assembly is carried by the discharge head 18 at the surface of the ground. Rotative power applied to the pump pulley 24 is transmitted by the pump shaft 3 to the impellers 22 below, which by their pumping action force the water up the discharge pipe 20 to the discharge opening 17 at the surface. The guide bearings are shown therein, supporting the pump shaft 3 at two points. They are attached to the inside of the discharge pipe 20 and operate entirely submerged in the column of water being discharged by the pump. In practical operation, the guide bearings are spaced at stated intervals throughout the length of the discharge pipe line in such number as may be required to properly support the pump shaft.

It will, of course, be understood that various changes in construction may be made at any time, if desired, within the scope of the appended claims without departing from the spirit of my invention, the drawings and description thereof herein contained illustrating and explaining merely the preferred embodiment of my inventon such as constitutes a disclosure of the principle involved.

Having thus described the invention, I claim:

1. In combination, in a pump, a vertical guide bearing for a vertical revoluble pump shaft, including a supporting element having a central cylindrical recessed chamber, and a resilient bearing sleeve revolubly mounted within said chamber and around the revoluble vertical pump shaft.

2. In combination, in a pump, a vertical guide bearing including a supporting element having a central cylindrical recessed chamber, a resilient bearing sleeve revolubly mounted within said chamber and adapted for supporting a revoluble vertical shaft, and a fixed support carrying the guide bearing and the sleeve in a column of water.

3. In combination, in a pump, a vertical guide bearing including a supporting element having a central cylindrical recessed chamber, a resilient bearing sleeve revolubly mounted within said chamber for supporting a revoluble vertical shaft and operating in a column of water, and means for effecting circulation of water within said bearing.

4. In combination, in a pump, a vertical guide bearing including a supporting element having a central cylindrical bearing chamber provided at its upper and lower ends with inwardly extending annular flanges, a resilient cylindrical bearing sleeve revolubly mounted within said chamber for supporting a revoluble vertical shaft, all operating in a column of water, and means for inducing circulation within said bearing.

5. In combination, in a pump, a vertical guide bearing including a supporting element having a central cylindrical chamber provided at its upper and lower ends with inwardly extending annular flanges, the upper flange being removable, a resilient cylindrical bearing sleeve revolubly retained within said chamber, a series of openings piercing the walls of said sleeve and arranged for inducing circulation within said bearing, and a vertical shaft journaled within said sleeve, all operating in a column of water.

6. In combination, in a pump, a vertical guide bearing including a supporting element having a central cylindrical recessed chamber, a series of openings piercing the wall of said chamber, a rubber bearing sleeve revolubly retained within said chamber and having a series of openings piercing its walls and arranged to aline with the openings in the wall of the chamber whereby to induce circulation of liquid within said bearing, and a vertical shaft journaled within said sleeve, all operating in a column of liquid delivered by said pump.

7. In combination, in a pump, a vertical guide bearing operating in a body of liquid and including a central recessed bearing chamber having perforated walls, and a vulcanized rubber bearing sleeve also having perforated walls and being revolubly mounted within said chamber, the perforations being arranged to coincide at times as the bearing sleeve revolves within the bearing chamber whereby to induce a circulation of liquid throughout said bearing.

8. In combination, in a pump, a discharge casing, a vertical guide bearing operating in a column of liquid delivered by the pump and including a stationary perforated bearing chamber attached to the inside of the discharge casing, a perforated rubber bearing sleeve revolubly mounted within said chamber, a vertical pump shaft journaled within said sleeve, a pump head on the shaft above the guide bearing, bowls below the bearing, and impellers carried by the shaft within the bowls.

9. In combination, in a pump, a vertical guide bearing consisting of a stationary recessed cylindrical chamber having perforated walls, a perforated rubber bearing sleeve of cylindrical form revolubly retained within the stationary recessed chamber, and a vertical shaft journaled within said sleeve and having a non-corrosive protecting sleeve covering the portions of said shaft which operate in the bearing, all operating in a body of liquid.

10. In combination, in a pump, a vertical guide bearing including a supporting element having a cylindrical recessed chamber with perforated walls and internally lined with a non-corrosive material, a cylindrical rubber bearing sleeve with perforated walls revolubly retained within said non-corrosive chamber, and a vertical shaft journaled within said sleeve and having a non-corrosive protective lining covering the shaft at the bearing portion, all operating in a body of liquid.

11. In combination, in a pump, a resilient cylindrical revoluble bearing sleeve, essentially of rubber and having perforations extending through its wall.

12. In combination, in a pump, a plurality of resilient revoluble guide bearings arranged in the discharge casing of a pump for loosely supporting a vertical rotatable pump shaft.

13. In combination, in a pump, a resilient vertical guide bearing comprising a stationary supporting member having a vertically extending cylindrical chamber with perforated walls, a bearing sleeve, essentially of vulcanized live rubber and of cylindrical form with perforated walls revolubly retained within the chamber of the supporting member, a non-corrosive metal protected shaft journaled within said sleeve, all operating in a column of liquid delivered by the pump, and means for effecting circulation of the liquid within said bearing.

IMMANUEL ALVIN OLIVER.